United States Patent
Ishihara

(10) Patent No.: US 10,666,474 B2
(45) Date of Patent: May 26, 2020

(54) MODULATOR AND SIGNAL TRANSMISSION SYSTEM

(71) Applicant: KABUSHIKI KAISHA TOSHIBA, Minato-ku (JP)

(72) Inventor: Hiroaki Ishihara, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/290,098

(22) Filed: Mar. 1, 2019

(65) Prior Publication Data

US 2020/0084075 A1 Mar. 12, 2020

(30) Foreign Application Priority Data

Sep. 7, 2018 (JP) .................................. 2018-168233

(51) Int. Cl.
*H04B 1/717* (2011.01)
*H04L 27/04* (2006.01)
*H04B 10/548* (2013.01)
*H04B 10/524* (2013.01)
*H04L 27/06* (2006.01)

(52) U.S. Cl.
CPC ........... *H04L 27/04* (2013.01); *H04B 10/524* (2013.01); *H04B 10/548* (2013.01); *H04L 27/06* (2013.01)

(58) Field of Classification Search
CPC ....... H04L 27/04; H04L 27/06; H04B 10/524; H04B 10/548
See application file for complete search history.

(56) References Cited

U.S. PATENT DOCUMENTS

| 4,415,861 A * | 11/1983 | Palmquist | H03K 5/156 327/176 |
| 5,477,196 A * | 12/1995 | Yamauchi | H03K 3/0315 327/158 |
| 9,923,643 B2 | 3/2018 | Dupuis et al. | |
| 2006/0055466 A1* | 3/2006 | Hirano | H03C 3/0925 331/16 |
| 2007/0195876 A1* | 8/2007 | Prodic | H03K 5/135 375/238 |
| 2007/0285140 A1* | 12/2007 | Kubo | H03K 7/08 327/182 |
| 2014/0043105 A1* | 2/2014 | Zerbe | H03K 3/0322 331/50 |

* cited by examiner

*Primary Examiner* — Syed Haider

(74) *Attorney, Agent, or Firm* — Oblon, McClelland, Maier & Neustadt, L.L.P.

(57) ABSTRACT

A modulator includes an oscillator to start an oscillation operation when an input data changes from a first logic to a second logic, and stops the oscillation operation when the input data changes from the second logic to the first logic, a pulse generator to output a predetermined number of pulses of a pulse signal having a predetermined pulse width when the input data changes from the second logic to the first logic, and a signal selector to select an oscillation signal outputted from the oscillator when the input data has the second logic, and selects the pulse signal outputted from the pulse generator when the input data has the first logic.

15 Claims, 14 Drawing Sheets

MODULATOR AND SIGNAL TRANSMISSION SYSTEM

CROSS REFERENCE TO RELATED APPLICATIONS

This application is based upon and claims the benefit of priority from the prior Japanese Patent Application No. 2018-168233, filed on Sep. 7, 2018, the entire contents of which are incorporated herein by reference.

FIELD

Embodiments described herein relate generally to modulators and signal transmission systems.

BACKGROUND

An OOK modulator is known, in which an oscillator performs an oscillation operation when input data having two values is at a High value, for example, and stops the oscillation operation when the input data is at a Low value when generating a modulation signal. A signal transmission system is also known, in which the modulation signal modulated by the OOK modulator of the aforementioned type is transmitted to the receiver side via an isolation device.

In the OOK modulator, the timing at which the input data is inputted is not in synchronization with the oscillation signal of the oscillator. Therefore, the phase of the oscillation signal at the time when the input data changes is not the same. Therefore, the value of the modulation signal varies when the input data changes from High to Low. As a result, the waveform of the modulation signal that is obtained when the oscillator stops the oscillation operation differs for every input data. Therefore, every time the input data is inputted, the delay time of the modulation signal varies, and jitter is generated. It is preferable to curb the jitter, which degrades the signal quality.

In a method for curbing the jitter, two modulation paths for performing OOK modulation are provided, one for an oscillation operation that is performed when input data is at a first logic level, and the other for an oscillation operation that is performed when the input data is at a second logic level, and the path for an oscillation signal is switched from the one path to the other in synchronization with the timing at the rising edge of the oscillation signal.

The two modulation paths, however, may increase the circuit size and the power consumption. Furthermore, in the signal transmission system using the isolation device, the area occupied by the isolation device is greater than the area occupied by other circuit blocks. Therefore, the need of a plurality of isolation devices may be disadvantageous.

DETAILED DESCRIPTION

According to one embodiment, a modulator includes: an oscillator to start an oscillation operation when an input data changes from a first logic to a second logic, and stops the oscillation operation when the input data changes from the second logic to the first logic;

a pulse generator to output a predetermined number of pulses of a pulse signal having a predetermined pulse width when the input data changes from the second logic to the first logic; and a signal selector to select an oscillation signal outputted from the oscillator when the input data has the second logic, and selects the pulse signal outputted from the pulse generator when the input data has the first logic.

Embodiments of the present invention will be described below with reference to the accompanying drawings. In the following descriptions of the embodiments, characteristic configurations and operations of the modulator and the signal transmission system are mainly described. However, there may be other configurations and operations that are not described below with respect to the modulator and the signal transmission system.

First Embodiment

Figure 1:
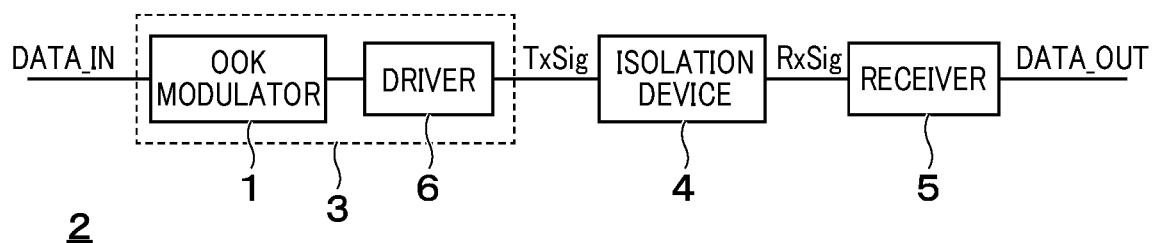
FIG. 1 is a block diagram of a signal transmission system including a modulator according to a first embodiment.

FIG. 1 is a block diagram of a signal transmission system 2 including a modulator 1 according to a first embodiment. The signal transmission system 2 shown in FIG. 1 includes a transmitter 3, an isolation device 4, and a receiver 5. In the signal transmission system 2 shown in FIG. 1, electrical insulation between the transmitter 3 side and the receiver 5 side is ensured by the isolation device 4 so that binary signal transmission may be performed even if the DC voltage level considerably differs between the transmitter 3 side and the receiver 5 side.

The transmitter 3 includes an on off keying (OOK) modulator 1, which is an example of the modulator 1, and a driver 6. The OOK modulator 1 outputs a signal when input data DATA_IN is at a predetermined logic level, and suspends the output when the input data DATA_IN is not at the predetermined logic level. The driver 6 is provided to improve the drive capability of the modulation signal outputted from the OOK modulator 1 to a level to drive the isolation device 4. If the modulation signal outputted from the OOK modulator 1 already has the drive capability to drive the isolation device 4, the driver 6 may be omitted.

The isolation device 4 may be realized by an arbitrary element that can electrically insulate the output signal from the transmitter 3 and the input signal to the receiver 5 from each other. For example, the isolation device 4 may be a capacitive element having a predefined breakdown voltage or a transformer. Although the signal transmission system 2 according to the first embodiment includes the isolation device 4, the modulator 1 of the first embodiment may be used in an arbitrary signal transmission system 2 employing OOK modulation. For example, the modulator 1 may be used for signal transmission using an arbitrary wireless communication line instead of the isolation device 4. More specifically, a wireless communication unit that wirelessly transmits and receives signals using a communication antenna and a reception antenna may be provided instead of the isolation device 4.

Figure 2:
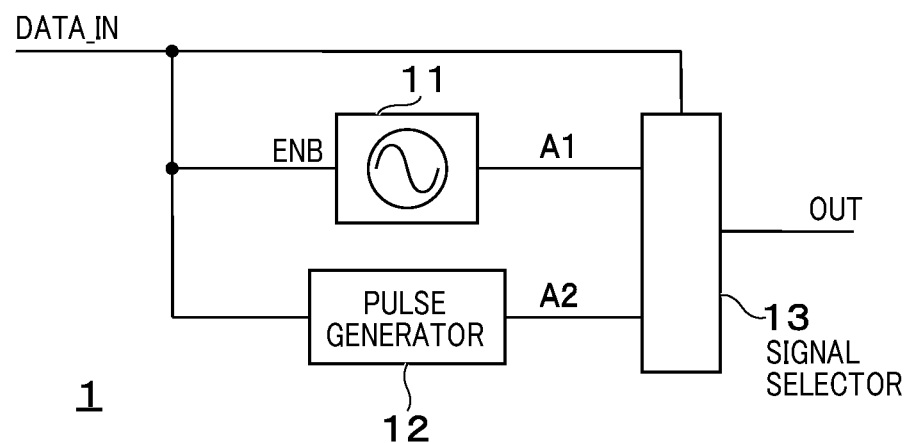
FIG. 2 is a block diagram illustrating an internal configuration of the OOK modulator according to the first embodiment.

FIG. 2 is a block diagram illustrating an internal configuration of the OOK modulator 1 according to the first embodiment. The OOK modulator 1 shown in FIG. 2 includes an oscillator 11, a pulse generator 12, and a signal selector 13.

The oscillator 11 starts oscillation at the timing when input data DATA_IN changes from a first logic to a second logic, and suspends the oscillation at the timing when the input data DATA_IN changes from the second logic to the first logic. The oscillator 11 has an enable terminal ENB for switching whether the oscillation operation is performed or not. The input data DATA_IN is inputted to the enable terminal ENB. For example, when the input data DATA_IN is at one of Low and High levels, the oscillator 11 performs the oscillation operation, and when it is at the other, the oscillator 11 suspends the oscillation operation. An example where the oscillator 11 performs the oscillation operation when the input data DATA_IN is at High, and suspends the oscillation operation when the input data DATA_IN is at Low will be described herein.

The pulse generator 12 outputs a predetermined number of pulses of a pulse signal having a predetermined pulse width at the timing when the input data DATA_IN changes from the second logic to the first logic. The input data DATA_IN is inputted to the pulse generator 12. More specifically, the pulse generator 12 outputs a predetermined number of pulses of the pulse signal having the predetermined pulse width immediately after the input data DATA_IN changes from High to Low.

The signal selector 13 selects an oscillation signal outputted from the oscillator 11 when the input data DATA_IN is at the second logic level, and selects the pulse signal outputted from the pulse generator 12 when the input data DATA_IN is at the first logic level. More specifically, the signal selector 13 selects the oscillation signal when the input data DATA_IN is High, and the pulse signal when the input data DATA_IN is Low. The signal selected by the signal selector 13 is outputted as the modulation signal from an output terminal of the OOK modulator 1.

Figure 3A:
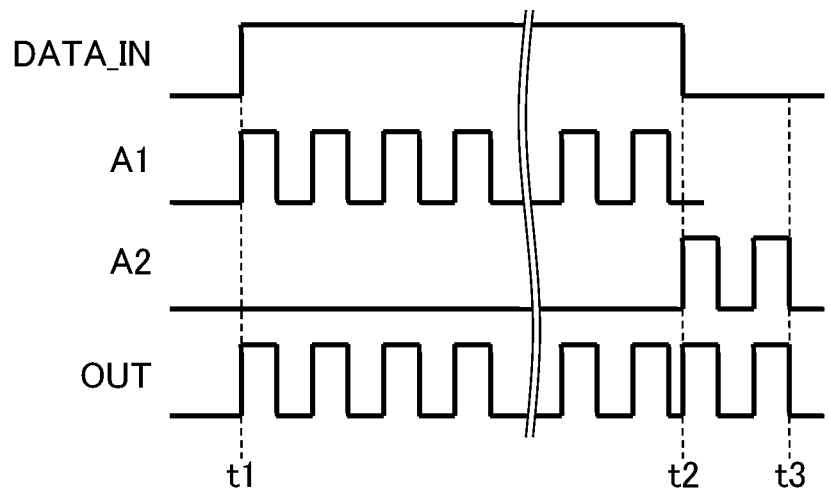
FIG. 3A is an operation timing diagram of the OOK modulator according to the first embodiment.
Figure 3B:
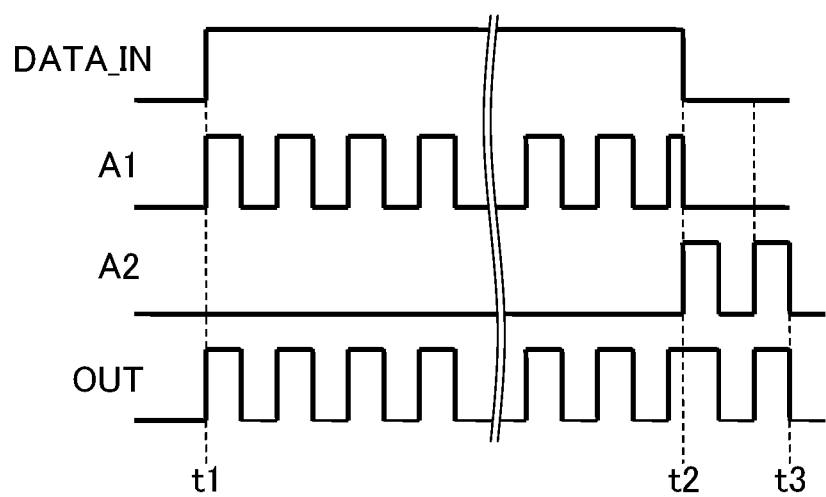
FIG. 3B is an operation timing diagram of the OOK modulator according to the first embodiment.

FIG. 3A and FIG. 3B are operation timing diagrams of the OOK modulator 1 according to the first embodiment. When the input data DATA_IN changes from Low to High at time t1, the oscillator 11 starts the oscillation operation. The signal selector 13 selects the oscillation signal outputted from the oscillator 11. Thereafter, when the input data DATA_IN changes from High to Low at time t2, the pulse generator 12 starts generating the pulse signal. The signal selector 13 selects the pulse signal outputted from the pulse generator 12. The pulse generator 12 keeps generating the pulse signal until time t3. Therefore, the modulation signal is the pulse signal from time t2 to time t3.

FIG. 3A and FIG. 3B differs from each other in the phase of the oscillation signal at time t2 where the input data DATA_IN changes from High to Low. In FIG. 3A, the oscillation signal is Low at time t2 while in FIG. 3B, the oscillation signal is High at time t2. The signal selector 13 switches the selection from the oscillation signal to the pulse signal at time t2. Therefore, the modulation signal in FIG. 3A has the phase of the oscillation signal until time t2, and the phase of the pulse signal after time t2. On the other hand, the modulation signal of FIG. 3B has a wide pulse width over time t2, the wide pulse width being obtained by adding the pulse width of the oscillation signal and the pulse width of the pulse signal.

The phase and the pulse width of the pulse signal that appear after time t2 is always the same regardless of the phase of the oscillator 11 in both FIG. 3A and FIG. 3B.

The receiver 5 performs non-synchronous demodulation on the modulation signal that is received via the isolation device 4, and generates output data DATA_OUT, which is a demodulation signal. Ideally, the output data DATA_OUT has the same frequency and the same pulse width as the input data DATA_IN inputted to the modulator 1.

Figure 4:
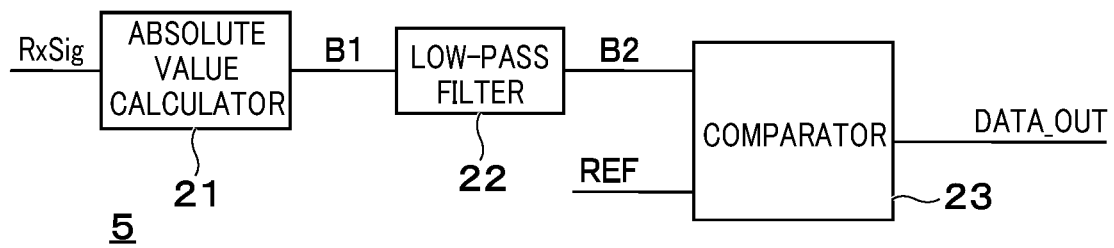
FIG. 4 is a block diagram showing a first example of a receiver.

Several internal configurations may be possible for the receiver 5 according to the first embodiment. FIG. 4 is a block diagram according to a first example of the receiver 5. The receiver 5 shown in FIG. 4 includes an absolute value calculator 21, a low-pass filter 22, and a comparator 23. The absolute value calculator 21 calculates an absolute value of the modulation signal received via the isolation device 4. The low-pass filter 22 detects the amplitude of the output signal from the absolute value calculator 21. The comparator 23 compares the output signal of the low-pass filter 22 with a reference level REF, and outputs a demodulation signal having one of two levels depending on whether the output signal of the low-pass filter 22 is higher or lower than the reference level REF. The demodulation signal outputted from the comparator 23 corresponds to the output data DATA_OUT.

Figure 5:
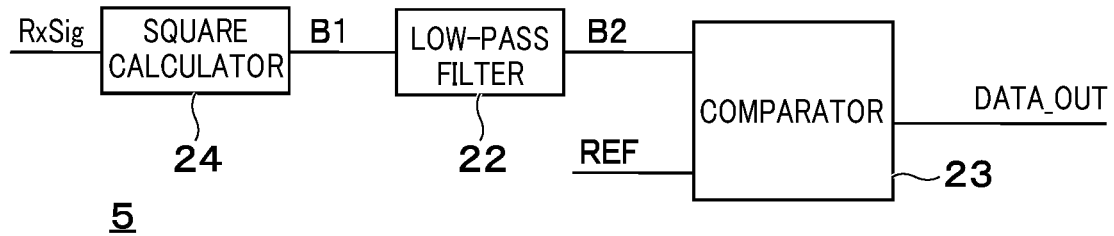
FIG. 5 is a block diagram showing a second example of the receiver.

FIG. 5 is a block diagram of a second example of the receiver 5. The receiver 5 shown in FIG. 5 includes a square calculator 24, a low-pass filter 22, and a comparator 23. The square calculator 24 calculates the square of the modulation signal received via the isolation device 4. The low-pass filter 22 detects the amplitude of the output signal of the square calculator 24. The operation of the comparator 23 shown in FIG. 5 is the same as that of the comparator 23 shown in FIG. 4.

The amplitude information may be obtained by performing a nonlinear calculation such as logarithm or square root instead of using the absolute value calculator 21 shown in FIG. 4 or the square calculator 24 shown in FIG. 5.

Figure 6:
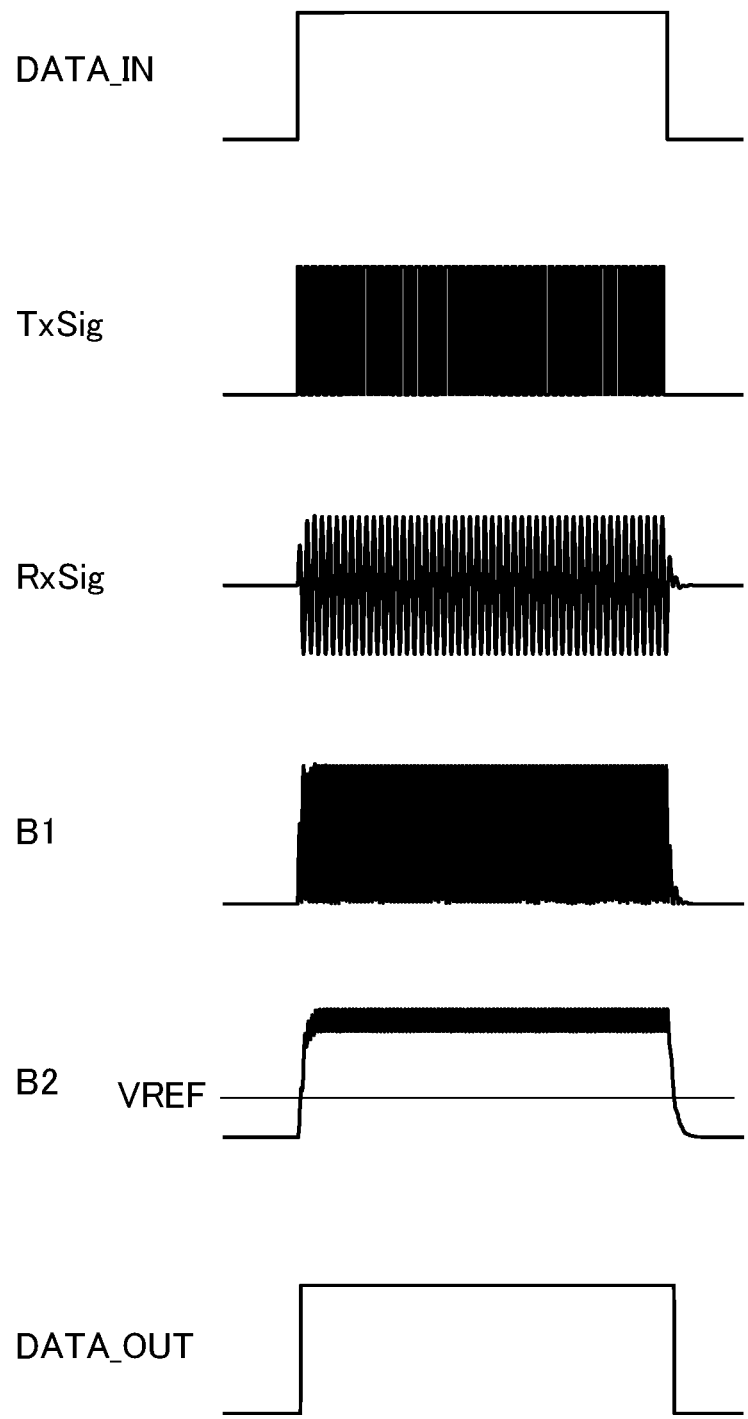
FIG. 6 is a signal waveform diagram of respective components of the receiver shown in FIG. 4.

FIG. 6 is a signal waveform diagram of the respective signals of the receiver 5 shown in FIG. 4. Waveforms of the input data DATA_IN inputted to the transmitter 3, the modulation signal TxSig outputted from the transmitter 3, the input signal RxSig inputted to the receiver 5, the output signal B1 from the absolute value calculator 21 in the receiver 5 shown in FIG. 4, the output signal B2 from the low-pass filter 22, and the output data DATA_OUT from the receiver 5 are shown in FIG. 6.

As shown in FIG. 6, the modulation signal TxSig outputted from the transmitter 3 differs in reference voltage level from the reception signal RxSig inputted to the receiver 5 since the transmitter 3 and the receiver 5 are electrically insulated from each other by the isolation device 4. The low-pass filter 22 detects the amplitude of the output signal from the absolute value calculator 21, and outputs a signal B2, which includes a ripple component. Since the signal outputted from the comparator 23 has one of two levels depending on the result of the comparison with the reference level REF, the output data DATA_OUT is caused to have a waveform that is similar to the waveform of the input data DATA_IN.

Figure 7A:
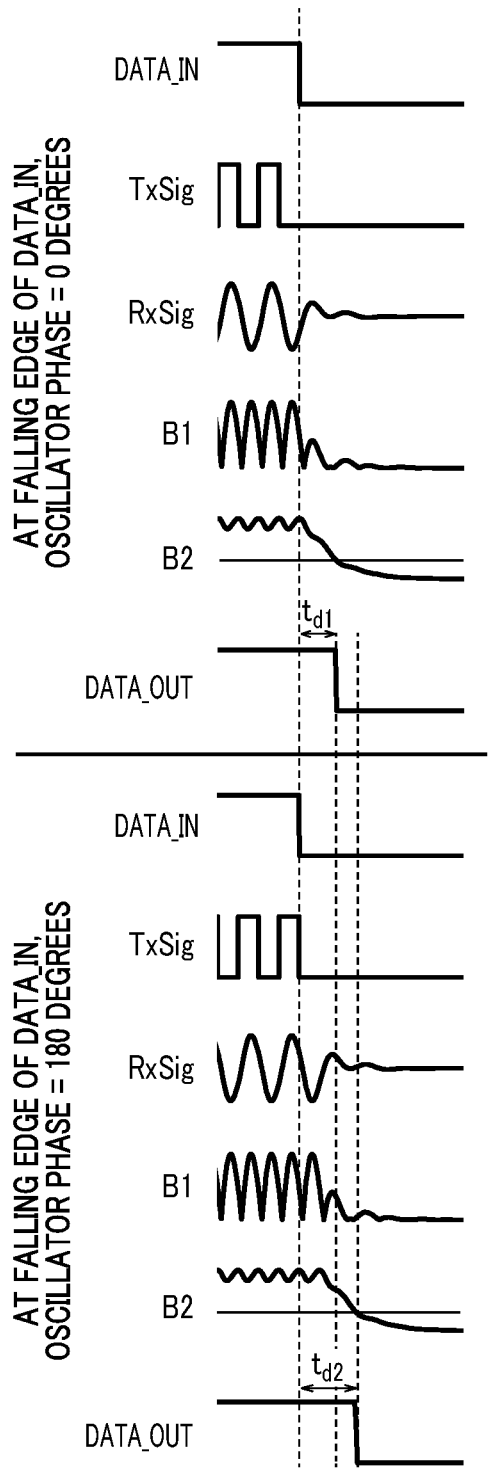
FIGS. 7A and 7B are detailed signal waveform diagrams around the time at which the input data shown in FIG. 6 changes from High to Low.
Figure 7B:
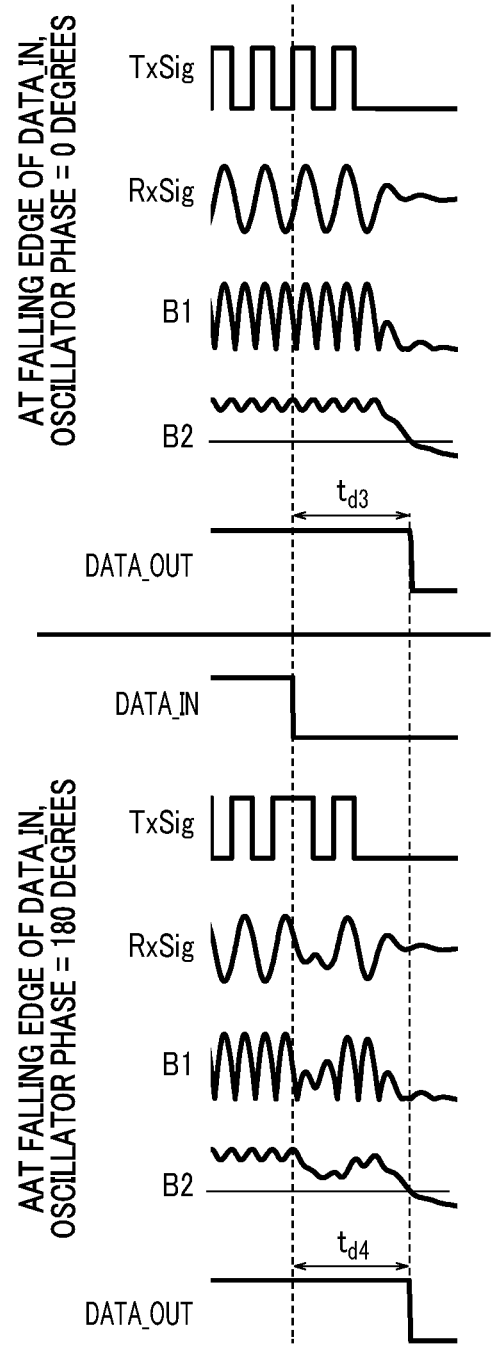

FIG. 7 is a detailed signal waveform diagram around the time when the input data DATA_IN shown in FIG. 6 changes from High to Low. FIG. 7A shows the signal waveforms in a case where the pulse generator 12 and the signal selector 13 are not provided, and FIG. 7B shows the signal waveforms in a case where the pulse generator 12 and the signal selector 13 are provided. The upper side of each of FIG. 7A and FIG. 7B shows an example in which the phase of the oscillation signal is 0 degrees when the input signal changes from High to Low, and the lower side shows an example in which the phase of the oscillation signal is 180 degrees when the input signal changes from High to Low.

In the case of FIG. 7A where the pulse generator 12 and the signal selector 13 are not provided, a phase difference is made to the output signal B2 from the low-pass filter 22 due to the difference in phase of the oscillation signal when the input data DATA_IN changes from High to Low. The phase difference further causes a difference in period of time from the time at which the input data DATA_IN changes from High to Low to the time at which the demodulation signal changes from High to Low between the upper side and the lower side of FIG. 7A. This difference in period of time corresponds to jitter.

In actual cases, the phase of the oscillator 11 at the falling edge of the input data DATA_IN has a random value in a range of 0 to 360 degrees if the input data DATA_IN is asynchronous to the operation of the oscillator 11.

The upper side of FIG. 7A corresponds to the case where the time difference between the falling edge of the input data DATA_IN and the falling edge of the demodulation signal is a minimum (=td1), and the lower side corresponds to the case where the time difference is a maximum (=td2). The time difference randomly distributes in a range from td1 to td2. Therefore, the maximum value of jitter generated is at random in a range from td1 to td2.

In FIG. 7B, which corresponds to the first embodiment, the frequency of the pulse signal outputted from the pulse generator 12 is the same as that of the oscillation signal, and the cycle of the pulse signal is 1.5 times that of the oscillation signal. Immediately after the input data DATA_IN changes from High to Low, the waveform of the output signal from the low-pass filter 22 has a difference caused by the phase difference between the input data DATA_IN and the oscillation signal. However, since a predetermined cycle of a pulse signal having the same frequency is added immediately after the input data DATA_IN changes from High to Low, the difference in waveform of the output signal from the low-pass filter 22 decreases as the time passes.

Even immediately after the input data DATA_IN falls, at which the difference of the output of the low-pass filter 22 considerably changes, the relationship between the output of the low-pass filter 22 and the reference level REF does not change. Therefore, the waveform of the output data DATA_OUT does not change.

After the output of the pulse signal from the pulse generator 12 stops, the output level of the low-pass filter 22 gradually decreases. When the output level crosses the level of the reference level REF, the output logic of the comparator 23 is inverted, and the output data DATA_OUT changes to Low.

As described above, in the example of the first embodiment shown in FIG. 7B, the time difference td3 from the falling edge of the input data DATA_IN to the falling edge of the demodulation signal in the case where the phase difference between the input data DATA_IN and the oscillation signal is 0 degrees substantially matches the time difference td4 in the case where the phase difference is 180 degrees. As a result, the jitter caused by the variations in phase difference between the input data DATA_IN and the oscillation signal at the falling edge of the input data DATA_IN may be reduced in the first embodiment.

The inventors have studied the jitter curbing effect of the OOK modulator 1 according to the first embodiment. Specifically, the phase of the oscillation signal at the falling edge of the input data DATA_IN was changed by 10 degrees each time, and a difference between a maximum value and a minimum value of the propagation delay time from the falling edge of the input data DATA_IN to the falling edge of the output data DATA_OUT of the receiver 5 was checked by circuit simulation. This corresponds to a maximum of propagation delay difference that may be caused by the phase of the oscillator 11. This will hereinafter be called "maximum propagation delay difference." The maximum propagation delay difference has a strong correlation with the magnitude of the jitter caused by the phase of the oscillator 11 when the DATA_IN changes from High to Low. As the value of the maximum propagation delay difference decreases, the jitter decreases, and the system has a better characteristic. In the simulation here, the pulse added has the same frequency as the frequency of the oscillator 11.

Figure 8:
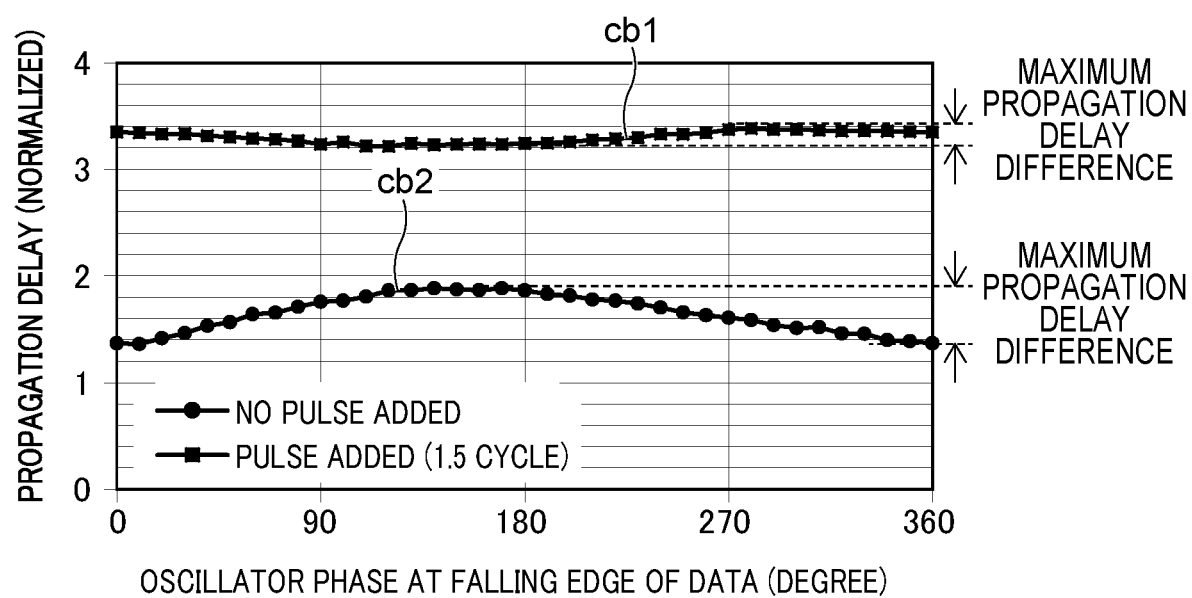
FIG. 8 is a diagram showing the propagation delay characteristic of the receiver.

FIG. 8 shows the propagation delay characteristic in a case where the order of the low-pass filter 22 included in the receiver 5 is set to be 2, and the cut-off frequency is set to be the same as the oscillation frequency of the oscillator 11. The curve line cb1 of FIG. 8 shows the characteristic of the first embodiment including the pulse generator 12 and the signal selector 13, and the curve line cb2 shows that of a case where the pulse generator 12 and the signal selector 13 are not provided. The propagation delay difference caused by the difference in phase of the oscillator 11 of the curve line cb1 is smaller than that of the curve line cb2. It was confirmed by this that the jitter characteristic is improved in the first embodiment.

Figure 9A:
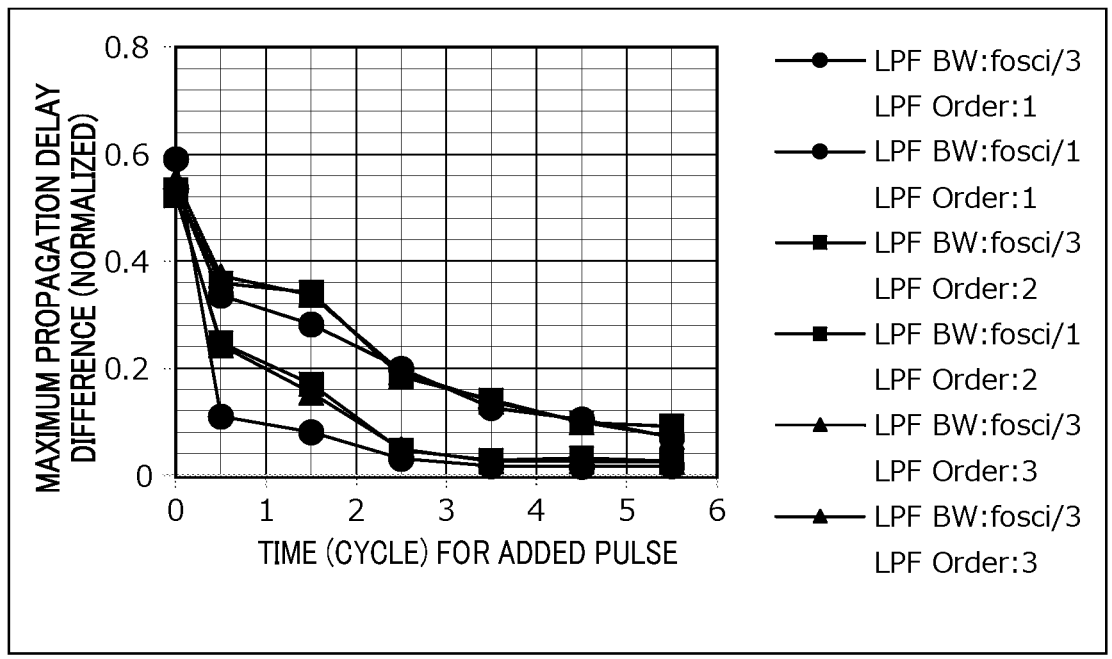
FIGS. 9A and 9B are diagrams showing the maximum propagation delay difference when the order and the cut-off frequency of the low-pass filter and the pulse width of a pulse signal outputted from a pulse generator are changed.

FIGS. 9A and )B are diagrams showing the maximum propagation delay difference in cases where the order and the cut-off frequency of the low-pass filter 22 and the pulse width of the pulse signal outputted from the pulse generator 12 are changed. FIG. 9A shows the maximum propagation delay difference of the receiver 5 including the absolute value calculator 21 shown in FIG. 4, and FIG. 9B shows the maximum propagation delay difference of the receiver 5 including the square calculator 24 shown in FIG. 5.

Figure 9B:
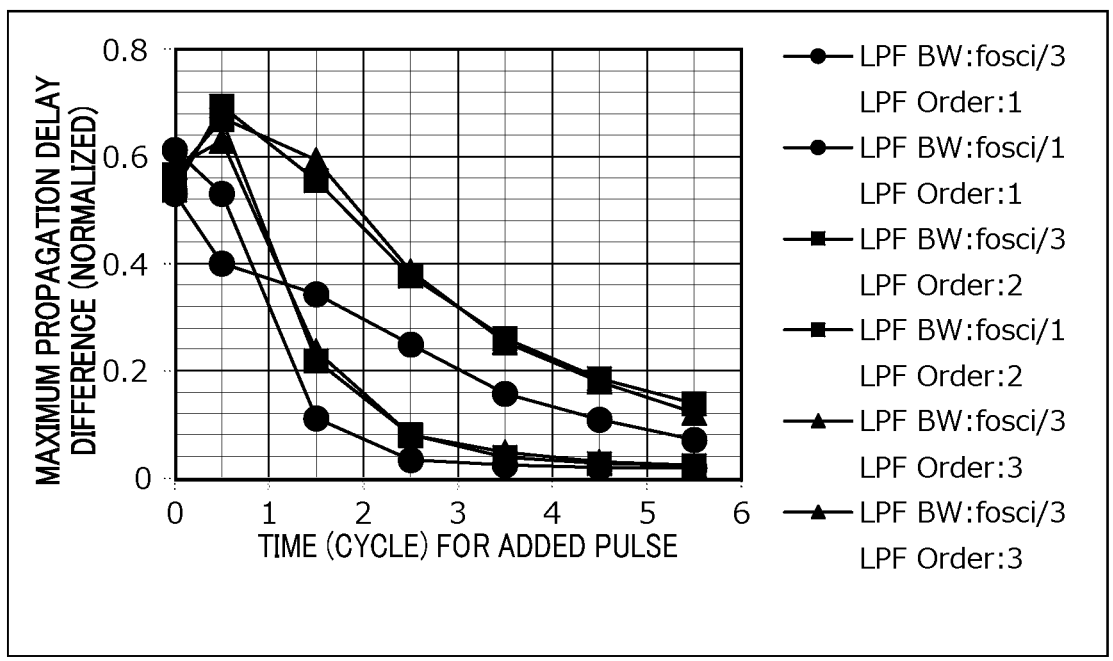

As shown in FIGS. 9A and 9B, even if the order and the cut-off frequency of the low-pass filter 22 and the pulse width of the pulse signal are changed, or the detection method using the absolute value calculator 21 or the square calculator 24 is changed, the jitter characteristic may be improved by optimizing the number of pulses and the pulse width of the pulse signal to be added, by providing the pulse generator 12 and the signal selector 13, although the maximum propagation delay difference may be different.

Thus, in the first embodiment, even if the phase difference between the input data DATA_IN and the oscillation signal varies, the maximum propagation delay difference of the output data DATA_OUT outputted from the receiver 5 may be decreased, thereby curbing the jitter since the pulse generator 12 and the signal selector 13 are provided to the OOK modulator 1 to add a pulse signal to the oscillation signal from the oscillator 11 when the modulation signal is generated at the time when the input data DATA_IN changes from High to Low.

Second Embodiment

In the OOK modulator 1 according to the first embodiment, a pulse signal is added to the oscillation signal to generate the modulation signal when the input data DATA_IN changes from High to Low. Therefore, the propagation delay time of the modulation signal increases in accordance with the number of pulses and the pulse width of the pulse signal to be added. The propagation delay time of the modulation signal outputted from the modulator 1 according to the first embodiment increases only when the input data DATA_IN changes from High to Low, but does not change when the input data DATA_IN changes from Low to High. Thus, there is a difference in the propagation delay time of the modulation signal between the case where the input data DATA_IN changes from Low to High and the case where the input data DATA_IN changes from High to Low. As a result, a difference is made between the pulse width of the input data DATA_IN and the pulse width of the output data DATA_OUT outputted from the receiver 5. This is called "pulse width distortion," which is unfavorable depending on the application, and therefore may need to be reduced.

Figure 10:
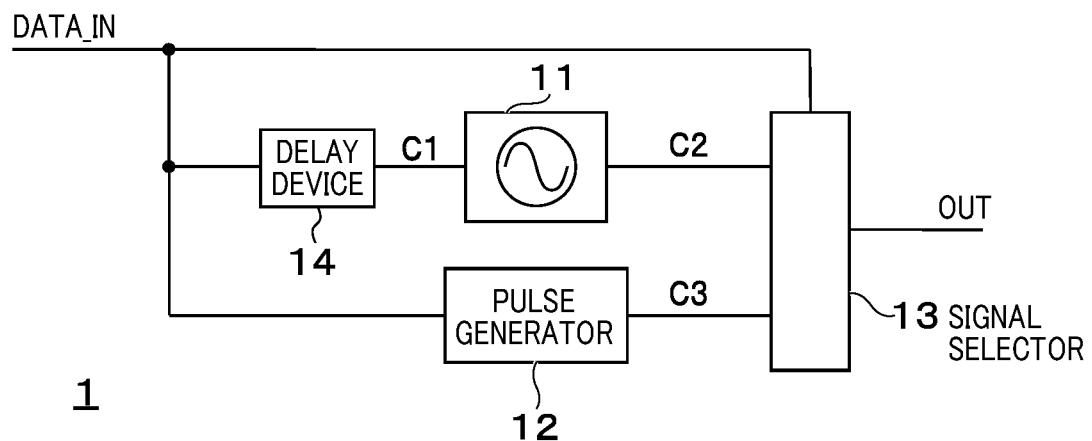
FIG. 10 is a block diagram illustrating a schematic configuration of an OOK modulator according to a second embodiment.

FIG. 10 is a block diagram illustrating a schematic configuration of an OOK modulator 1 according to a second embodiment. The OOK modulator 1 shown in FIG. 10 includes a delay device 14 in addition to the configuration shown in FIG. 2. The delay device 14 delays the input data DATA_IN for a predetermined period of time, and outputs delayed data. More specifically, the delay device 14 outputs the delayed data obtained by delaying the input data DATA_IN for a period of time that is substantially the same as the period of time during which the pulse signal is outputted from the pulse generator 12.

The oscillator 11 starts oscillation when the logic of the delayed data changes from a first logic to a second logic, and stops oscillation when the logic of the delayed data changes from the second logic to the first logic. The pulse generator 12 outputs a predetermined number of pulses of the pulse signal having a predetermined pulse width when the input data DATA_IN changes from the second logic to the first logic. The signal selector 13 selects the oscillation signal outputted from the oscillator 11 when the input data DATA_IN is at the second logic level, and selects the pulse signal outputted from the pulse generator 12 when the input data DATA_IN is at the first logic level.

Figure 11:
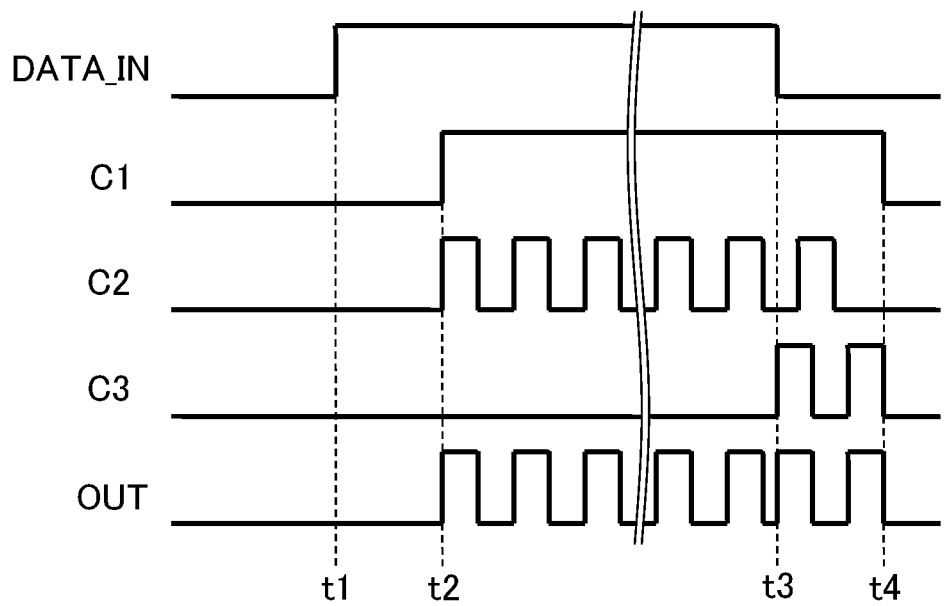
FIG. 11 is an operation timing diagram of the OOK modulator shown in FIG. 10.

FIG. 11 is an operation timing diagram of the OOK modulator 1 shown in FIG. 10. When the input data DATA_IN changes from Low to High at time t1, the delay device 14 delays the input data DATA_IN for a predetermined period of time to output the delayed data. Therefore, the delayed data changes from Low to High at time t2.

When the delayed data changes from Low to High, the oscillator 11 starts the oscillation operation to output the oscillation signal. Thereafter, when the input data DATA_IN changes from High to Low at time t3, the pulse generator 12 starts outputting the pulse signal. At this time, the oscillator 11 is still performing the oscillation operation. However, the signal selector 13 switches from the selection of the oscillation signal to the selection of the pulse signal at time t3. At time t4, the oscillator 11 stops the oscillation operation. The pulse generator 12 outputs a predetermined number of pulses of the pulse signal having a predetermined pulse width from time t3.

Thus, in the second embodiment, the delay device 14 is connected before the oscillator 11 to delay the input data DATA_IN. Accordingly, the modulation signal may be delayed not only when the input data DATA_IN changes from High to Low but also when the input data DATA_IN changes from Low to High. As a result, the pulse width of the input data DATA_IN and the pulse width of the output data DATA_OUT outputted from the receiver 5 may substantially match each other. This may curb the pulse width distortion.

Third Embodiment

The oscillator 11 included in each of the first and second embodiments may be a ring oscillator circuit having a delay circuit.

Figure 12:
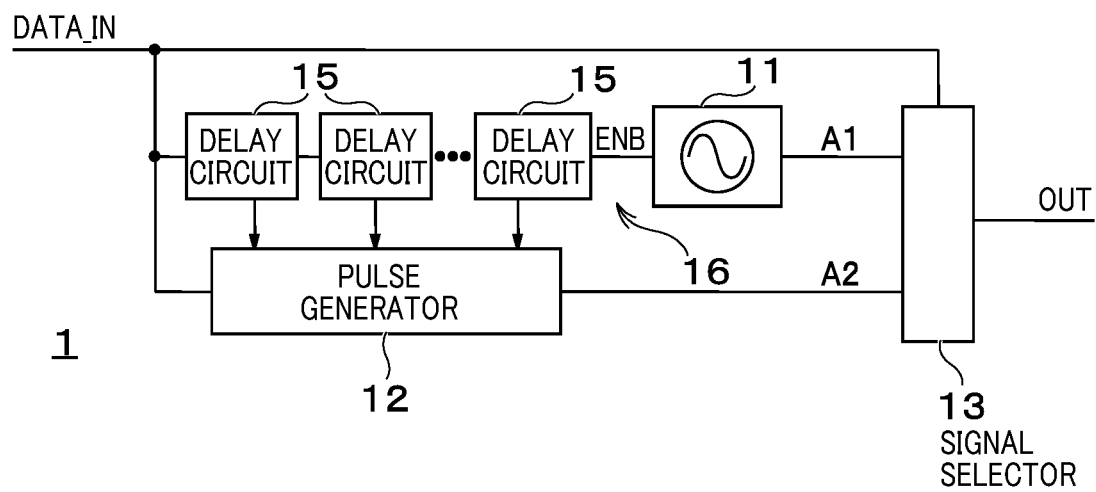
FIG. 12 is a block diagram illustrating a schematic configuration of an OOK modulator according to a third embodiment.

FIG. 12 is a block diagram illustrating a schematic configuration of an OOK modulator 1 according to a third embodiment. Like the OOK modulator 1 shown in FIG. 2 or FIG. 10, the OOK modulator 1 shown in FIG. 12 includes an oscillator 11, a pulse generator 12, and a signal selector 13. However, the internal configuration of a ring oscillator 16 including the oscillator 11 is different from that of the oscillator 11 shown in FIG. 2 or FIG. 10. The ring oscillator 16 shown in FIG. 12 includes multiple delay circuits 15 that sequentially delay the input data DATA_IN, and inverts and delays the output data of the last delay circuit 15 connected at the end of the multiple delay circuits 15, and sends a feedback to the input side of the last delay circuit 15 to generate the oscillation signal.

The pulse generator 12 generates the pulse signal based on the output data of each of the multiple delay circuits 15. The multiple delay circuits 15 may be used as the delay device 14 shown in FIG. 10 if the delayed time of the multiple delay circuits 15 is caused to match the period of time during which the pulse signal is outputted from the pulse generator 12.

Figure 13:
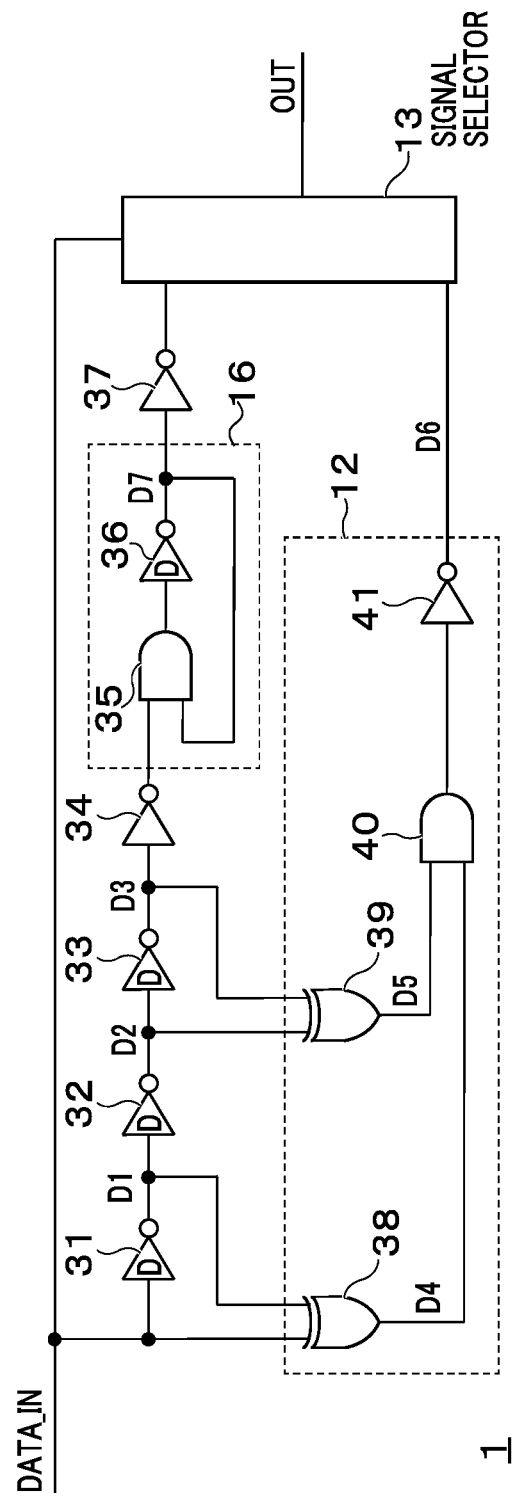
FIG. 13 is a specific circuit diagram of the OOK modulator corresponding to FIG. 12.

FIG. 13 is a specific circuit diagram of an OOK modulator 1 corresponding to FIG. 12. In FIG. 13, the multiple delay circuits 15 are formed by three inverters 31 to 33 that are connected in series. Another inverter 34 is connected to the last inverter 33 of the series-connected inverters so that the logic matches the logic of the input data DATA_IN. The number of inverters corresponding to the multiple delay circuits 15 may be arbitrarily selected. Instead of the inverters, logic gates for outputting a signal with an inverted logic may be used as the multiple delay circuits 15.

The ring oscillator circuit 16 shown in FIG. 13 includes an AND gate 35 and an inverter 36. The inverter 36 is connected after the AND gate 35, and the output of the inverter 36 is inputted to the AND gate 35 as a feedback. The AND gate 35 performs an AND operation on the output of the inverter 34 and the output of the inverter 36. Another inverter 37 is connected after the ring oscillator circuit 16 to match the logic to the logic of the input data DATA_IN. The oscillation signal is outputted from the inverter 37. The ring oscillator circuit 16 shown in FIG. 13 may be obtained by connecting an odd number of logic inverting elements to form a ring shape. The type and the number of logic inverting elements may be arbitrarily determined.

The pulse generator 12 shown in FIG. 13 includes an XOR gate 38 for calculating an exclusive OR of the input data DATA_IN and the output from the inverter 31 in the first stage, an XOR gate 39 for calculating an exclusive OR of the output of the inverter 32 in the second stage and the output of the inverter 33 in the third stage, an AND gate 40 for performing an AND operation of the outputs from the XOR gates 38 and 39, and an inverter 41 for inverting the output of the AND gate 40.

Figure 14:
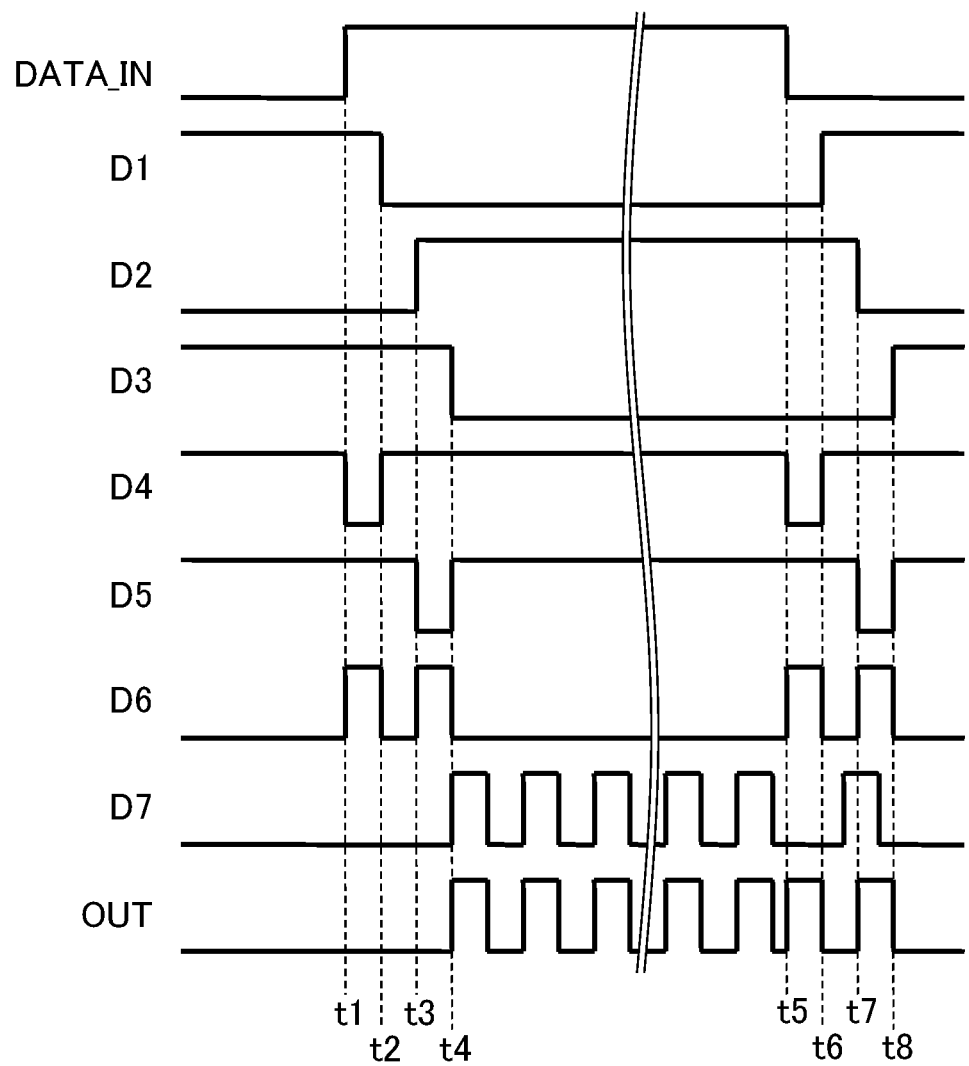
FIG. 14 is an operation timing diagram of the OOK modulator shown in FIG. 13.

FIG. 14 is an operation timing diagram of the OOK modulator 1 shown in FIG. 13. In the following descriptions, the inverter 31, the inverter 32, the inverter 33, and the inverter 36 are assumed to be delay circuits making a delay that is more effective than the delay made by other logic circuit blocks. When the input data DATA_IN changes from Low to High at time t1, the output of the inverter 31, which corresponds to the delay circuit 15 in the first stage of the multiple delay circuits 15, changes from High to Low at time t2. The output of the XOR gate 38 changes from High to Low at time t1, and from Low to High at time t2. As a result, the pulse generator 12 outputs the first pulse during a period of time from time t1 to time t2.

Thereafter, the output of the inverter 32 in the second stage changes from Low to High at time t3. Then, the output of the inverter 33 in the third stage changes from High to Low at time t4. The output of the XOR gate 39 changes from High to Low at time t3, and changes from Low to High at time t4. As a result, the pulse generator 12 outputs the second pulse during a period of time from t3 to t4.

At time t4, the input to the ring oscillator circuit 16 changes to High, and the ring oscillator circuit 16 starts the oscillation operation to output the oscillation signal. Since the signal selector 13 selects the oscillation signal outputted from the ring oscillator circuit 16 when the input data DATA_IN is High, the oscillation signal is outputted as the modulation signal after time t4.

Thereafter, the input data DATA_IN changes from High to Low at time t5, and the signal selector 13 selects the pulse signal outputted from the pulse generator 12.

At time t5, the input data DATA_IN changes from High to Low, and the output of the inverter 31 in the first stage of the multiple delay circuits 15 changes from Low to High at time t6. The output of the XOR gate 38 changes from High to Low at time t5, and changes from Low to High at time t6. Thus, the output of the XOR gate 38 is Low from time t5 to time t6. Accordingly, the pulse generator 12 outputs the first pulse after the input data DATA_IN changes from High to Low during a period of time from t5 to t6.

Thereafter, the output of the inverter 32 in the second stage changes from High to Low at time t7, and the output of the inverter 33 in the third stage changes from Low to High at time t8. Thus, the pulse generator 12 outputs the second pulse after the input data DATA_IN changes from High to Low during a period of time from t7 to t8.

After time t5, the signal selector 13 selects the pulse signal outputted from the pulse generator 12. Therefore, when the input data DATA_IN changes from High to Low, the modulation signal outputted includes the oscillation signal outputted from the oscillator 11 and a predetermined number of pulses of the pulse signal having a predetermined pulse width.

Thus, in the OOK modulator 1 according to the third embodiment, the oscillator 11 includes the multiple delay circuits 15 and the ring oscillator circuit 16. As in the second embodiment, the pulse cycle of the input data DATA_IN and the pulse cycle of the output data DATA_OUT from the receiver 5 substantially match each other, since the delay time of the delay circuits 15 is set to match the period during which the pulse signal is outputted immediately after the input data DATA_IN changes from High to Low. The pulse signal outputted from the pulse generator 12 can be generated by using the outputs of the respective stages of the delay circuits 15. Therefore, the configuration of the pulse generator 12 can be simplified.

Fourth Embodiment

In the second embodiment described above, the delay device 14 is connected before the oscillator 11 in order to adjust the delay time of the modulation signal when the input data DATA_IN changes from High to Low. Instead of connecting the delay device 14 before the oscillator 11, a timing adjustment unit is provided to the receiver 5 side in a fourth embodiment.

Figure 15:
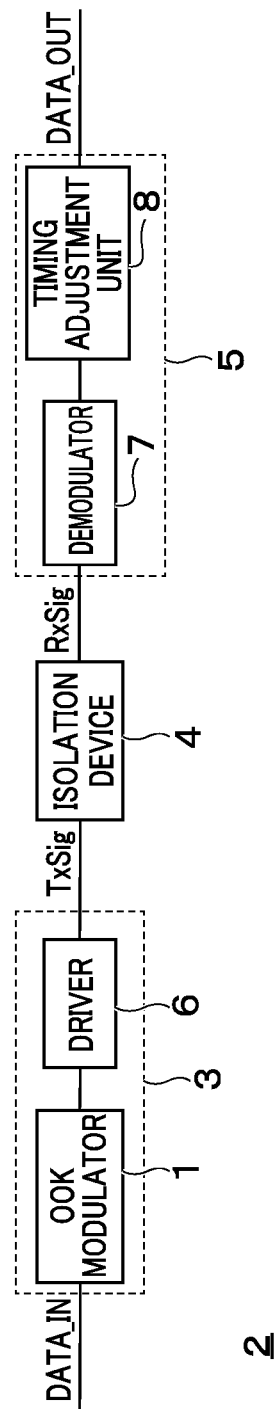
FIG. 15 is a block diagram illustrating a schematic configuration of a signal transmission system according to a fourth embodiment.

FIG. 15 is a block diagram illustrating a schematic configuration of a signal transmission system 2 according to a fourth embodiment. In addition to the elements shown in FIG. 1, the signal transmission system 2 shown in FIG. 15 includes a timing adjustment unit 8 provided after the demodulator 7 of the receiver 5.

The timing adjustment unit 8 adjusts the timing of the initial part of the output data DATA_OUT from the demodulator 7 based on the number of pulses and the pulse width of the pulse signal outputted from the pulse generator 12 of the OOK modulator 1. Specifically, the timing adjustment unit 8 adjusts the timing at which the output data DATA_OUT from the demodulator 7 changes from Low to High so as to correspond to the timing at which the input data DATA_IN changes from Low to High. More specifically, the timing adjustment unit 8 adjusts the timing at which the output data DATA_OUT from the demodulator 7 changes from Low to High so as to correspond to the period of time during which the pulse signal is outputted from the pulse generator 12 immediately after the input data DATA_IN changes from High to Low.

The timing adjustment unit 8 may be formed with a delay circuit 15 for delaying the output data DATA_OUT from the demodulator 7. The period of time during which the timing adjustment unit 8 delays the output data DATA_OUT from the demodulator 7 may be determined by a test at the time of the manufacture. The delay time may be adjusted by trimming the wiring line pattern of the delay circuit 15. The delay time of the timing adjustment unit 8 may be adjusted again by inputting the input data DATA_IN having a known pulse width to the OOK modulator 1 every time the system starts or at predetermined time intervals.

The signal transmission system 2 may include both the delay device 14 shown in FIG. 10 and the timing adjustment unit 8 shown in FIG. 15.

Thus, in the fourth embodiment, the pulse signal is added to the modulation signal when the input data DATA_IN changes from High to Low to delay the modulation signal. The timing adjustment unit 8 is provided after the demodulator 7 of the receiver 5 to adjust the timing at which the output data DATA_OUT changes from Low to High. As a result, the pulse width of the input data DATA_IN and the pulse width of the output data DATA_OUT of the receiver 5 substantially match each other, as in the second embodiment.

Fifth Embodiment

In the first to fourth embodiments described above, the pulse signal outputted from the pulse generator 12 has a pulse waveform that does not vary at every falling edge of the input data DATA_IN, and the frequency of the pulse signal is not necessarily the same as the frequency of the oscillation signal outputted from the oscillator 11. Therefore, the oscillator 11 may be an oscillation circuit having an arbitrary circuit configuration such as an LC oscillation circuit or the ring oscillator circuit 16. The pulse generator 12 may also have an arbitrary circuit configuration. If, however, the frequency of the oscillation signal outputted from the oscillator 11 and the frequency of the pulse signal outputted from the pulse generator 12 considerably differ from each other, the band for passing signals may need to be broadened for the isolation device 4 and the receiver 5. This may make the system configuration complicated, and increase the costs. From this point of view, it is desirable that the frequency of the pulse signal outputted from the pulse generator 12 substantially match the frequency of the oscillation signal outputted from the oscillator 11.

Sixth Embodiment

An OOK modulator 1 according to a sixth embodiment has a configuration that is basically different from the configurations of the first to fifth embodiments.

Figure 16:
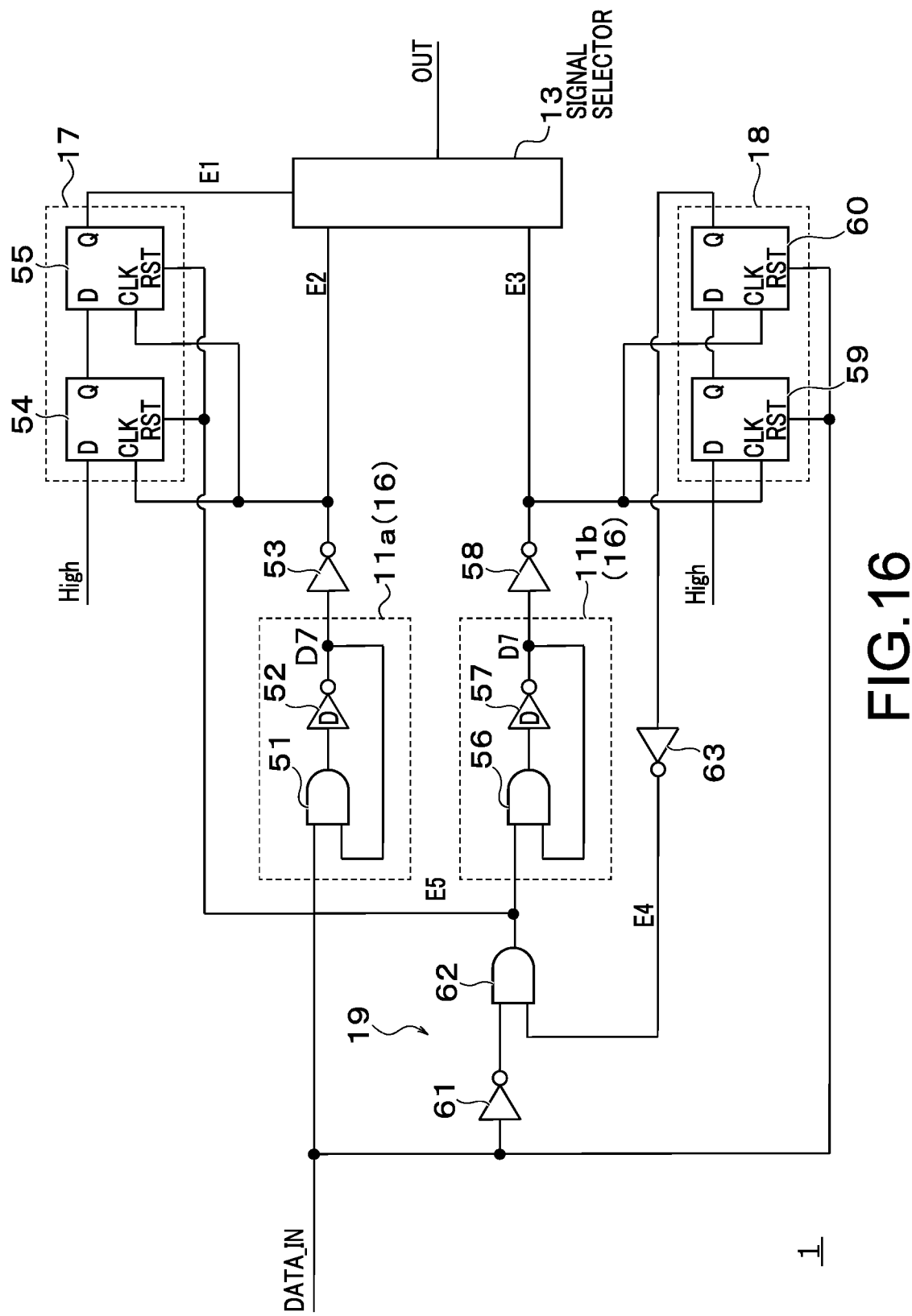
FIG. 16 is a circuit diagram of an OOK modulator according to a sixth embodiment.

FIG. 16 is a circuit diagram of the OOK modulator 1 according to the sixth embodiment. The OOK modulator 1 shown in FIG. 16 includes a first oscillator 11a, a first measurement device 17, a second oscillator 11b, a second measurement device 18, an oscillation control unit 19, and a signal selector 13.

The first oscillator 11a starts an oscillation operation when an input data DATA_IN changes from a first logic to a second logic, and stops the oscillation operation when the input data DATA_IN changes from the second logic to the first logic. The first oscillator 11a may be the ring oscillator circuit 16. The ring oscillator circuit 16, which serves as the first oscillator 11a, includes an AND gate 51 and an inverter 52. The output of the AND gate 51 is inputted to the inverter 52, and the output of the inverter 52 and the input data DATA_IN are inputted to the AND gate 51. The output of the inverter 52 is inverted by another inverter 53 to generate the oscillation signal.

The first measurement device 17 detects that the number of oscillations of the first oscillator 11a reaches a first number of oscillations. The first measurement device 17 includes cascade-connected two flip-flops 54 and 55. Each of the flip-flops 54 and 55 operates in synchronization with the oscillation signal outputted from the first oscillator 11a. Each of the flip-flops 54 and 55 is brought into a reset state when the output signal of the oscillation control unit 19 changes to High. The output of the flip-flop 55 in the second stage is used as the selection signal of the signal selector 13.

The second oscillator 11b starts an oscillation operation when the input data DATA_IN changes from the second logic to the first logic. The second oscillator 11b may be the ring oscillator circuit 16, for example. The ring oscillator circuit 16, which serves as the second oscillator 11b, includes an AND gate 56 and an inverter 57. The output of the AND gate 56 is inputted to the inverter 57, and the output of the inverter 57 and the output of the oscillation control unit 19 are inputted to the AND gate 56. The output of the inverter 57 is inverted by another inverter 58 to generate the pulse signal.

The second measurement device 18 detects that the number of oscillations of the second oscillator 11b reaches a second number of oscillations. The second measurement device 18 includes cascade-connected two flip-flops 59 and 60. Each of the flip-flops 59 and 60 operates in synchronization with the oscillation signal outputted from the second oscillator 11b. Each of the flip-flops 59 and 60 is brought into a reset state when the input data DATA_IN changes to High. The output of the flip-flop 60 in the second stage is inputted to the oscillation control unit 19.

When the second measurement device 18 detects that the second number of oscillations is reached, the oscillation control unit 19 stops the oscillation operation of the second oscillator 11b. The oscillation control unit 19 includes an inverter 61, an AND gate 62, and an inverter 63. The inverter 61 inverts the input data DATA_IN. The inverter 63 inverts the output of the flip-flop 60 in the second stage of the second measurement device 18. The AND gate 62 performs an AND operation on the output of the inverter 61 and the output of the inverter 63, and outputs an AND signal. The output of the AND gate 62 is inputted to the reset terminals of the two flip-flops 54 and 55 of the first measurement device 17, and also to the AND gate 56 of the second oscillator 11b.

The signal selector 13 selects the oscillation signal outputted from the first oscillator 11a after the first measurement device 17 detects that the first number of oscillations is reached and until the input data DATA_IN changes from the second logic to the first logic. After the input data DATA_IN changes from the second logic to the first logic, the signal selector 13 selects the oscillation signal outputted from the second oscillator 11b.

Figure 17:
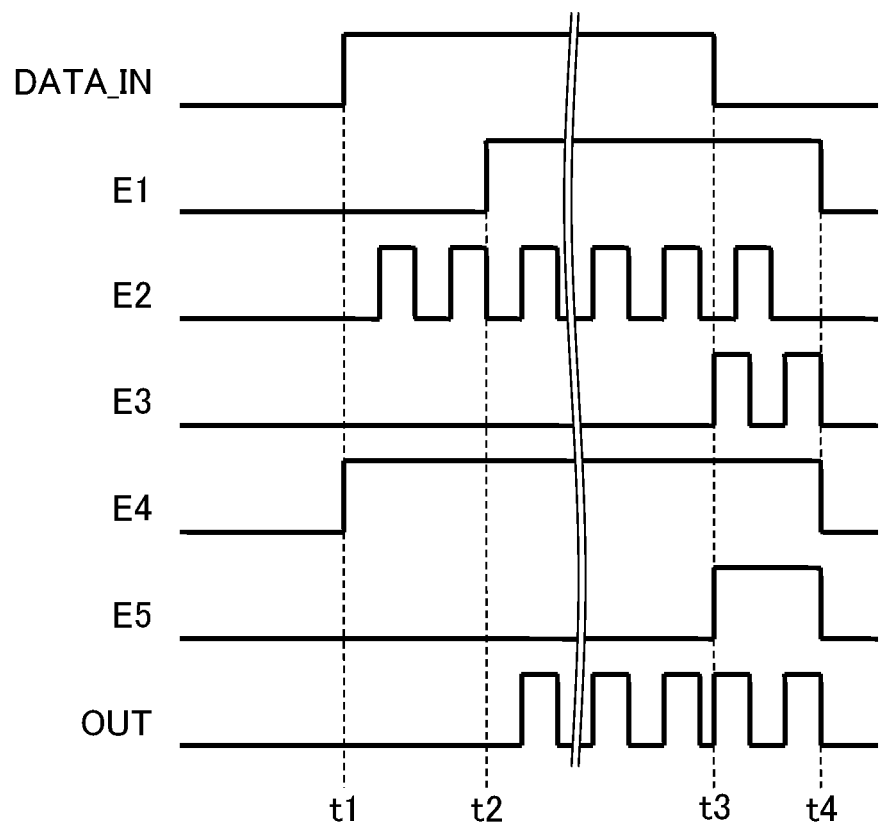
FIG. 17 is an operation timing diagram of the OOK modulator shown in FIG. 16.

FIG. 17 is an operation timing diagram of the OOK modulator 1 shown in FIG. 16. When the input data DATA_IN changes from Low to High at time t1, the first oscillator 11a starts the oscillation operation and outputs the oscillation signal. When the input data DATA_IN changes to High at time t1, the two flip-flops 59 and 60 in the second measurement device 18 are brought into a reset state. As a result, the output of the flip-flop 60 in the second stage becomes Low, and the output of the inverter 63 becomes High.

At time t1, the output of the inverter 61 in the oscillation control unit 19 becomes Low, and the output of the AND gate 62 becomes Low. As a result, the reset state of the two flip-flops 54 and 55 in the first measurement device 17 is cancelled. Thereafter, the flip-flops 54 and 55 measure the number of oscillations of the oscillation signal outputted from the first oscillator 11a.

At time t2, the output E1 of the flip-flop 55 in the second stage of the first measurement device 17 changes from Low to High. As a result, the signal selector 13 selects the oscillation signal outputted from the first oscillator 11a as the modulation signal.

When the input data DATA_IN changes from High to Low at time t3, the output E5 of the AND gate 62 in the oscillation control unit 19 changes to High. As a result, the second oscillator 11b starts the oscillation operation. When the output E5 of the AND gate 62 becomes High, the two flip-flops 54 and 55 in the first measurement device 17 are brought into the reset state. Therefore, the output E1 of the flip-flop 55 in the second stage becomes Low. As a result, the signal selector 13 selects the oscillation signal outputted from the second oscillator 11b as the modulation signal. Then, at time t4, the output of the flip-flop 60 in the second stage of the second measurement device 18 becomes High. Therefore, the output E5 of the AND gate 62 in the oscillation control unit 19 becomes Low, and the second oscillator 11b stops the oscillation operation.

Thus, in the OOK modulator 1 according to the sixth embodiment, when the input data DATA_IN changes from Low to High, the first measurement device 17 measures the number of oscillations of the oscillation signal outputted from the first oscillator 11a until the number reaches a predetermined number. When the predetermined number is reached, the signal selector 13 selects the oscillation signal. Thereafter, when the input data DATA_IN changes from High to Low, the second oscillator 11b starts the oscillation operation and outputs the oscillation signal, and the signal selector 13 selects the oscillation signal. As a result, the period of time during which the modulation signal is outputted matches the pulse width of the input data DATA_IN.

The number of pulses added to the modulation signal when the input data DATA_IN changes from High to Low may be adjusted by the number of flip-flops within the second measurement device 18.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A modulator comprising:
an oscillator to start an oscillation operation in response to a change of an input data from a first logic to a second logic, and stops the oscillation operation in response to a change of the input data from the second logic to the first logic;
a pulse generator to output a predetermined number of pulses of a pulse signal having a predetermined pulse width in response to the change of the input data from the second logic to the first logic; and
a signal selector to select an oscillation signal outputted from the oscillator in response to the input data of the second logic, and selects the pulse signal outputted from the pulse generator in response to the input data of the first logic.

2. The modulator according to claim 1, wherein the oscillator comprises:
a plurality of delay circuits to sequentially delay the input data; and
a ring oscillator circuit to invert and delay an output data from a last delay circuit of the plurality of delay circuits, and feeds back the inverted and delayed data to an input side of the last delay circuit to generate the oscillation signal.

3. The modulator according to claim 2, wherein the pulse generator generates the pulse signal based on output data from each of the plurality of delay circuits.

4. A modulator comprising:
a delay device to receive an input data, and output delayed data obtained by delaying the input data for a predetermined period of time;
an oscillator to start an oscillation operation in response to a change of the delayed data from a first logic to a second logic, and stops the oscillation operation in response to a change of the delayed data from the second logic to the first logic;
a pulse generator to output a predetermined number of pulses of a pulse signal having a predetermined pulse width in response to change of the input data from the second logic to the first logic; and
a signal selector to select an oscillation signal outputted from the oscillator in response to the change of the input data of the second logic, and selects the pulse signal outputted from the pulse generator in response to the input data of the first logic.

5. The modulator according to claim 4, wherein the delay device comprises
a plurality of delay circuits to sequentially delay the input data; and
the oscillator comprises a ring oscillator circuit to invert and delay an output data from a last delay circuit of the plurality of delay circuits, and feeds back the inverted and delayed data to an input side of the last delay circuit to generate the oscillation signal.

6. The modulator according to claim 4, wherein the oscillator comprises:
a plurality of delay circuits to sequentially delay the input data; and
a ring oscillator circuit to invert and delay an output data from a last delay circuit of the plurality of delay circuits, and feeds back the inverted and delayed data to an input side of the last delay circuit to generate the oscillation signal, and
wherein the delay device includes the plurality of delay circuits.

7. The modulator according to claim 5, wherein the pulse generator generates the pulse signal based on output data from each of the plurality of delay circuits.

8. The modulator according to claim 6, wherein the pulse generator generates the pulse signal based on output data from each of the plurality of delay circuits.

9. A modulator comprising:
a first oscillator to start an oscillation operation in response to a change of an input data from a first logic to a second logic, and stops the oscillation operation in response to a change of the input data from the second logic to the first logic;
a first measurement device to detect that the number of oscillations of the first oscillator reaches a first number of oscillations;
a second oscillator to start an oscillation operation in response to the change of the input data from the second logic to the first logic;
a second measurement device to detect that the number of oscillations of the second oscillator reaches a second number of oscillations;
an oscillation control unit to stop the oscillation operation of the second oscillator in response to a detection of the second measurement device that the second number of oscillations is reached; and
a signal selector to select an oscillation signal outputted from the first oscillator after the first measurement device detects that the first number of oscillations is reached and until the input data from the second logic to the first logic, and selects a pulse signal outputted from the second oscillator in response to the change of the input data from the second logic to the first logic.

10. The modulator according to claim 9, wherein the first oscillator comprises:
a plurality of first delay circuits to sequentially delay the input data; and
a first ring oscillator circuit to invert and delay an output data from a last first delay circuit of the plurality of first delay circuits, and feeds back the inverted and delayed data to an input side of the last first delay circuit to generate the oscillation signal.

11. The modulator according to claim 9, wherein the second oscillator comprises:
a plurality of second delay circuits to sequentially delay the input data; and
a second ring oscillator circuit to invert and delay an output data from a last second delay circuit of the plurality of second delay circuits, and feeds back the inverted and delayed data to an input side of the last second delay circuit to generate the pulse signal.

12. A signal transmission system comprising:
a transmitter including a modulator:
an isolation device to transmit a modulation signal outputted from the transmitter in an insulated manner; and
a receiver including a demodulator to demodulate the modulation signal transmitted via the isolation device, wherein the modulator includes:
an oscillator to start an oscillation operation in response to a change of an input data from a first logic to a second logic, and stops the oscillation operation in response to a change of the input data from the second logic to the first logic;
a pulse generator to output a predetermined number of pulses of a pulse signal having a predetermined pulse width in response to the change of the input data from the second logic to the first logic; and
a signal selector to select an oscillation signal outputted from the oscillator in response to the change of the input data to the second logic, and selects the pulse signal outputted from the pulse generator in response to the input data of the first logic.

13. The signal transmission system according to claim 12, wherein the receiver includes:
a demodulator to generate a demodulation signal based on the modulation signal; and
a timing adjustment unit to adjust timing of an initial part of the demodulation signal based on the number of pulses and the pulse width of the pulse signal.

14. The signal transmission system according to claim 12, wherein the oscillator comprises:
a plurality of delay circuits to sequentially delay the input data; and
a ring oscillator circuit to invert and delay an output data from a last delay circuit of the plurality of delay circuits, and feeds back the inverted and delayed data to an input side of the last delay circuit to generate the oscillation signal.

15. The signal transmission system according to claim 14, wherein the pulse generator generates the pulse signal based on output data from each of the plurality of delay circuits.

* * * * *